UNITED STATES PATENT OFFICE.

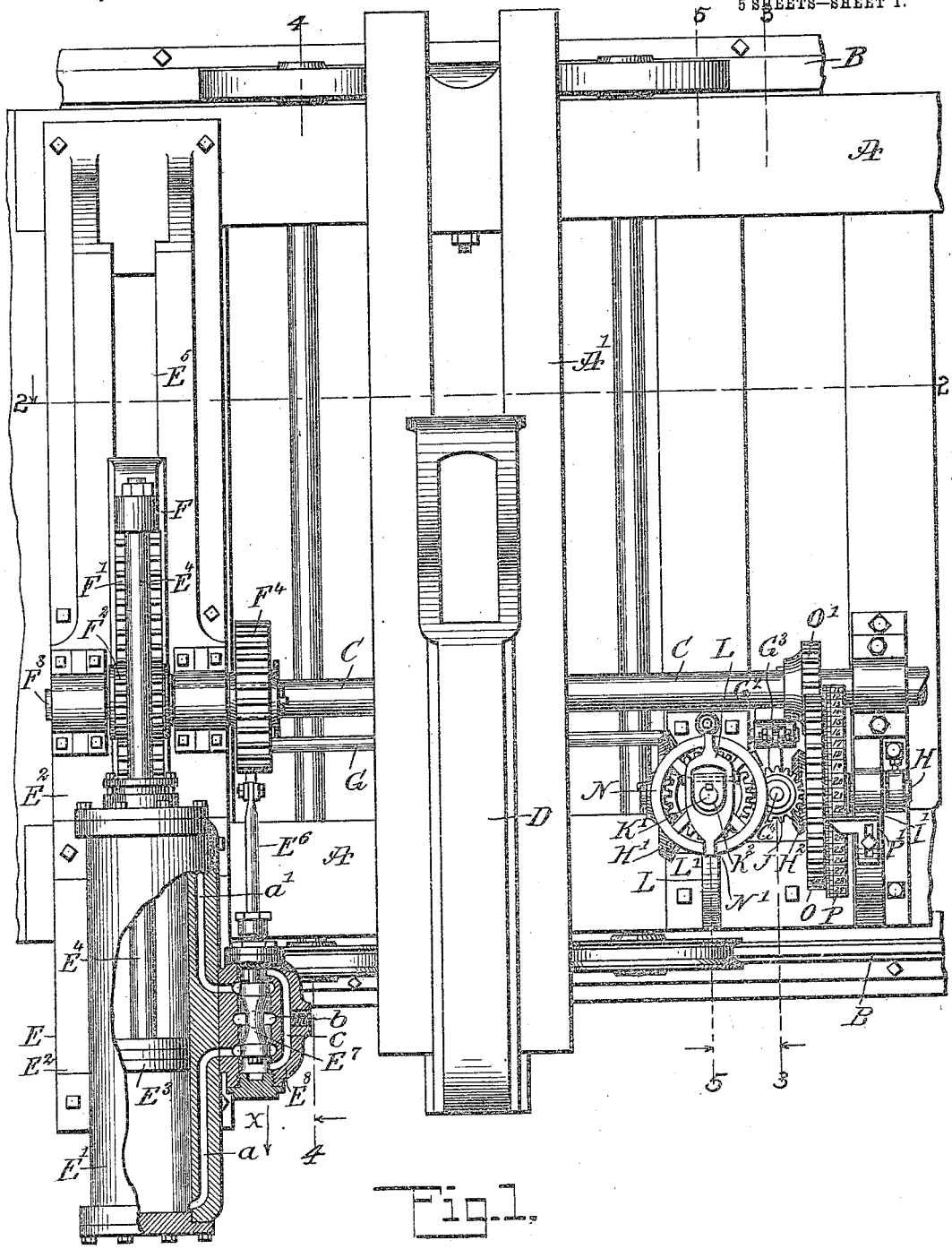

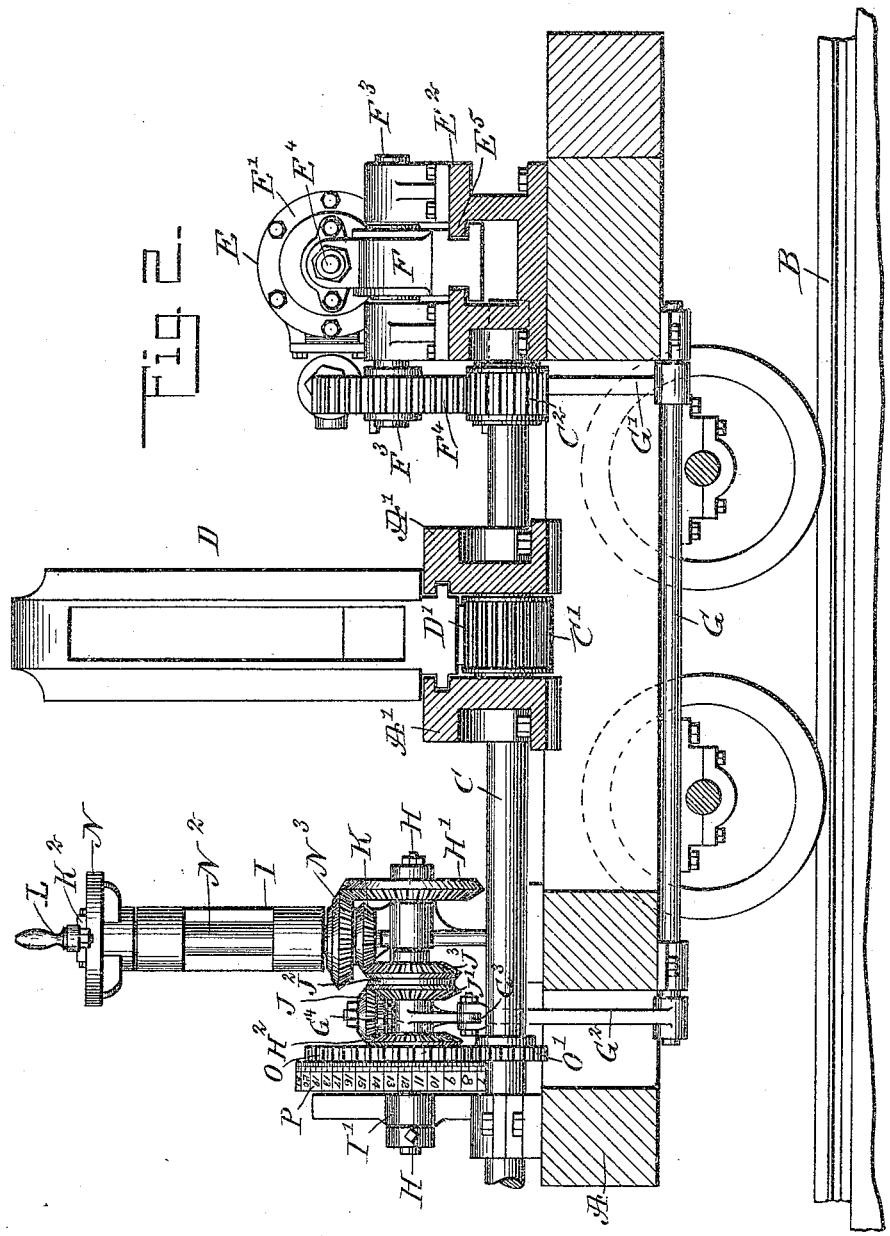

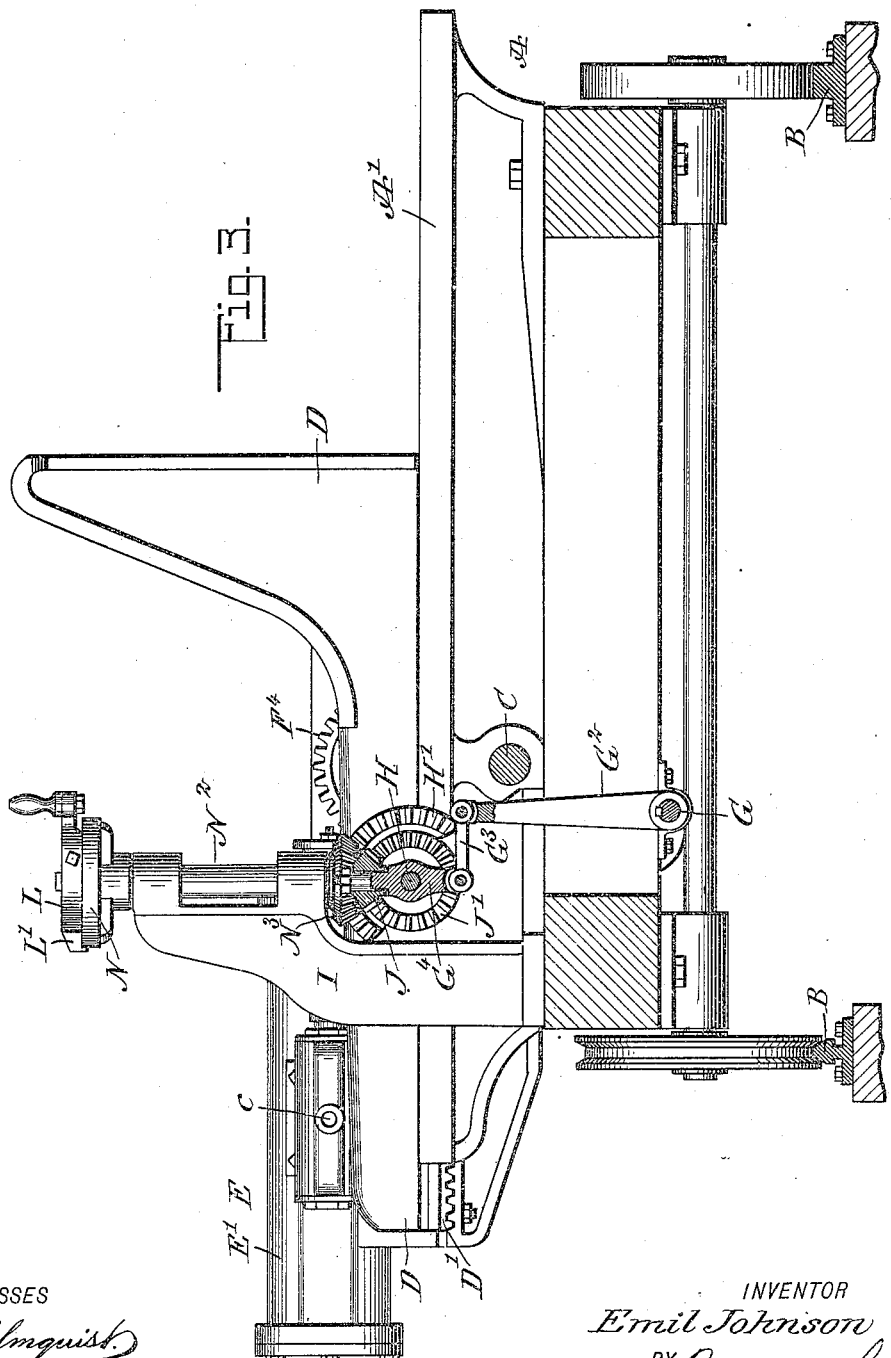

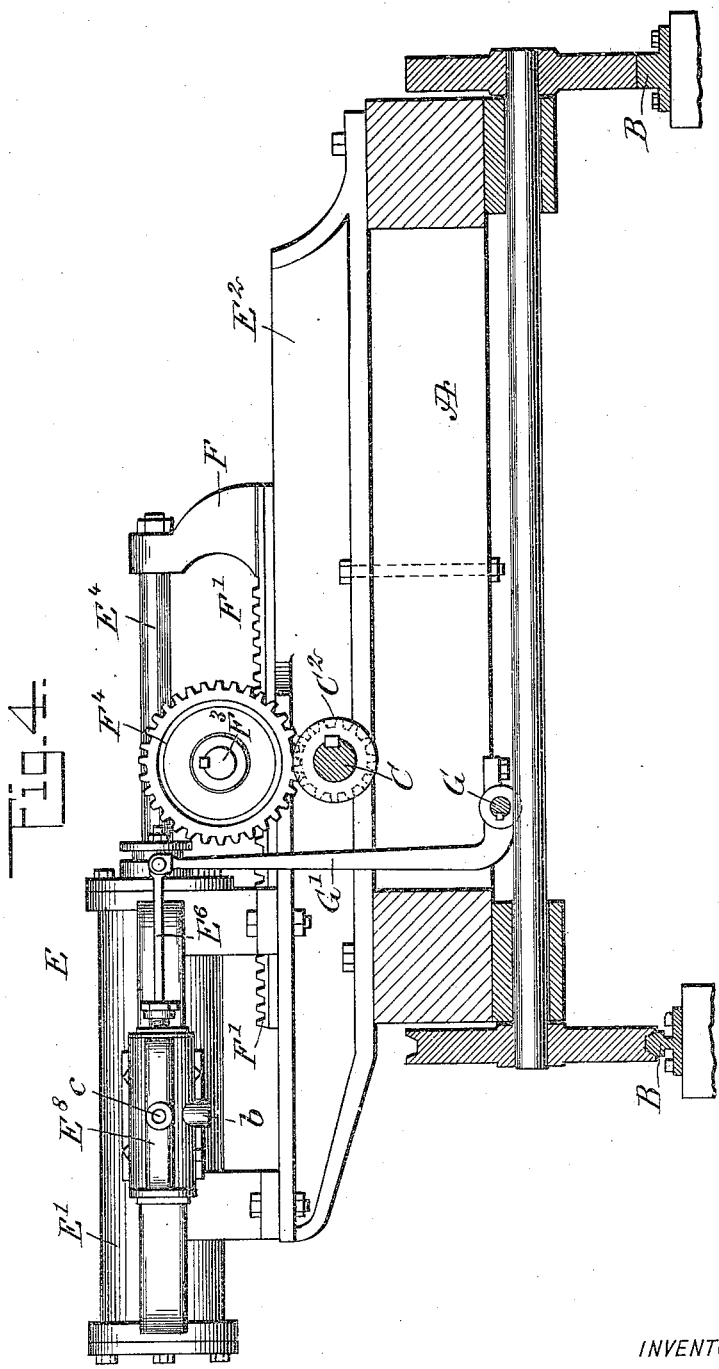

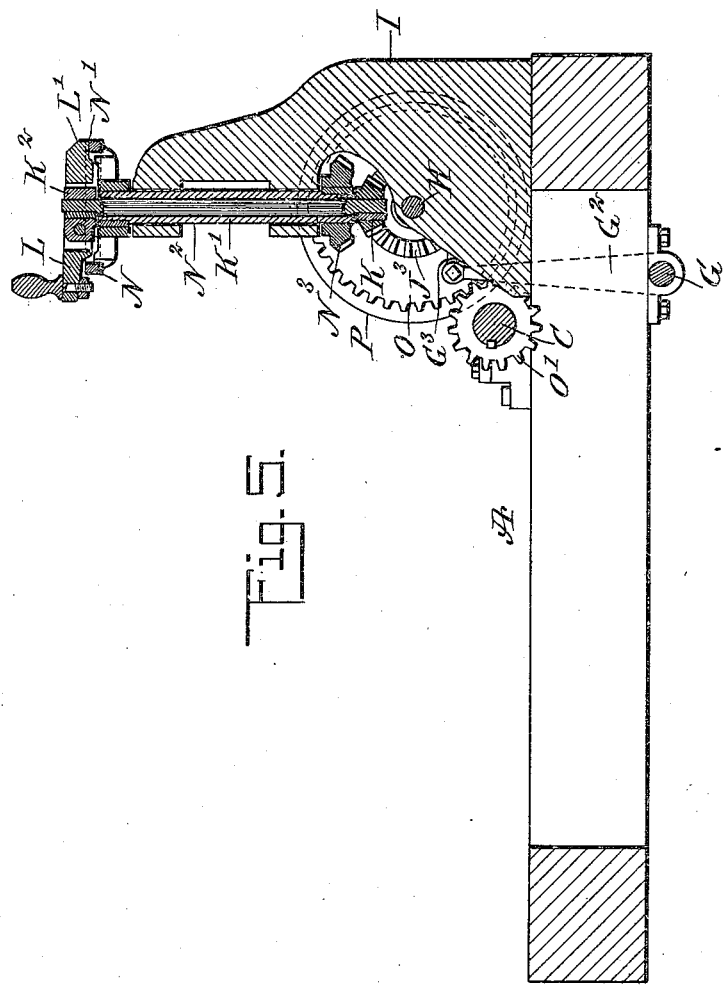

EMIL JOHNSON, OF POTLATCH, IDAHO.

SAWMILL SET-WORKS.

952,811.  Specification of Letters Patent.  Patented Mar. 22, 1910.

Application filed October 21, 1908. Serial No. 458,743.

*To all whom it may concern:*

Be it known that I, EMIL JOHNSON, a citizen of the United States, and a resident of Potlatch, in the county of Latah and State of Idaho, have invented new and useful Improvements in Sawmill Set-Works, of which the following is a full, clear, and exact description.

The invention relates to saw mills, and its object is to provide certain new and useful improvements in saw mill set works, whereby the operator is permitted to automatically control the head block knees wholly independently of the main set mechanism, and with a view to move the head block knees toward or from the saw and to stop the knees accurately in the desired position.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 1 is a plan view of the improvement, parts being in section; Fig. 2 is a sectional side elevation of the same on the line 2—2 of Fig. 1; Fig. 3 is a transverse section of the same on the line 3—3 of Fig. 1; Fig. 4 is a similar view of the same on the line 4—4 of Fig. 1; and Fig. 5 is a like view of the same on the line 5—5 of Fig. 1.

The carriage A of the saw mill is mounted to travel in the usual manner on the rails B, and on the said carriage A is journaled the longitudinally-extending main or set shaft C provided with pinions C', each in mesh with a rack D', formed or secured on the base of the corresponding head block knee D, mounted to slide transversely in suitable bearings A' arranged on the carriage A. The main shaft C is adapted to be rotated by a suitable main set work (not shown), for moving the head block knees D in the usual manner. In order to move the head block knees independently of the said main set mechanism, I provide an auxiliary power set works which forms the present invention, and which is arranged as follows:

An engine E is provided with a transversely-extending cylinder E' mounted on a suitable bed $E^2$, attached to the carriage A, and in the said cylinder E' reciprocates a piston $E^3$, having its piston rod $E^4$ connected at the outer end with a cross head F, mounted to slide in suitable bearings $E^5$, arranged on the bed $E^2$. The cross head F carries a rack F' in mesh with a pinion $F^2$ secured on a shaft $F^3$ journaled in suitable bearings arranged on the bed $E^2$, and on the shaft $F^3$ is secured a gear wheel $F^4$ in mesh with a pinion $C^2$, secured to the main or set shaft C. Thus when the engine E is actuated, that is, when steam or other motive power is admitted to one end of the cylinder E', then the shaft C is rotated, to move the head block knees D in one direction, and when steam is admitted to the other end of the cylinder E' then the head block knees D are caused to move in an opposite direction.

In order to govern the movement of the piston $E^3$ in the cylinder E', use is made of a shifting mechanism connected with the stem $E^6$ of the admission valve $E^7$, controlling the motive agent to the ends of the cylinder E' by way of the ports $a, a'$. Normally the admission valve $E^7$ is in a dead center position, that is, the motive agent is shut off from both ends of the cylinder E', but when the admission valve $E^7$ is shifted outward in the direction of the arrow $x$, then the motive agent passes by way of the port $a$ into the outer end of the cylinder E', to push the piston $E^3$ inward in the inverse direction of the arrow $x$. When the admission valve $E^7$ is moved in the inverse direction of the arrow $x$, then the motive agent is admitted to the inner end of the cylinder E' by way of the port $a'$, to push the piston $E^3$ in the direction of the arrow $x$. By the gearing above described, the head block knees D move in the same direction as the piston $E^3$ in the cylinder E'.

As shown in Fig. 1 the valve chest $E^8$ is connected with a steam supply at $b$ and is provided with an exhaust port $c$.

The outer end of the valve stem $E^6$ is pivotally connected with an arm G' of a rock shaft G (see Fig. 4), extending longitudinally and journaled in suitable bearings on the under side of the carriage A. On the rock shaft G is secured another arm $G^2$ (see Figs. 2, 3 and 5), connected by a link $G^3$ with the lower end of a hanger $G^4$, mounted to swing loosely on a stub shaft H journaled in bearings arranged on standards I and I' attached to the carriage A. On the upper end of the hanger $G^4$ is mounted to turn a bevel pinion J in mesh with the face J' of a two-faced bevel gear wheel $J^2$, mounted to rotate loosely on the shaft H. The other face $J^3$ of the two-faced bevel gear $J^2$ is in mesh with a pinion K, secured to the lower end of a vertical shaft $K'$, provided at its upper end with a boss or collar $K^2$, on which a hand lever L is fulcrumed. The free end $L'$ of the hand lever is adapted to engage a notch $N'$ in a disk N, secured to the upper end of a hollow shaft $N^2$, journaled in suitable bearings on the standard I, and in the said hollow shaft $N^2$ is journaled the shaft $K'$ above mentioned. On the lower end of the hollow shaft $N^2$ is secured a bevel $N^3$ in mesh with a bevel gear wheel $H'$ secured on the shaft H, and on the latter are secured the bevel gear wheel $H^2$, the spur wheel O and the index wheel P, and of which the bevel gear wheel $H^2$ is in mesh with the bevel pinion J, opposite the face $J'$ of the two-faced bevel gear wheel $J^2$, see Fig. 2. The spur wheel O is in mesh with a pinion $O'$ secured on the main or set shaft C, so that when the engine E is not running and the shaft C is stationary, the pinion $O'$ holds the gear wheel O and consequently the pinion $H^2$, the index wheel P, the shaft H and the gear wheels $H'$, $N^3$, the hollow shaft $N^2$ and the hand wheel N from turning for the time being. Now when the operator presses down on the handle end of the hand lever L, the free end $L'$ thereof disengages the notch $N'$ to permit the operator to turn the hand lever L and with it the shaft $K'$, so that the pinion K turns the double-faced bevel gear wheel $J^2$, and the latter rotates the pinion J. Now as the latter meshes with the gear wheel $H^2$ held against movement for the time being, as before stated, it is evident that the pinion J rolls off on the gear wheel $H^2$, and hence imparts a swinging motion to the hanger $G^4$, whereby the link $G^3$ and arm $G^2$ impart a rocking motion to the shaft G, and the latter by the arm $G'$ shifts the stem $E^6$ and the valve $E^7$ in a direction corresponding to the direction in which the hand lever L is turned. Thus when the hand lever L is turned from the position shown in Fig. 1 to the left, the valve $E^7$ is moved in the direction of the arrow $x$, to admit steam to the outer end of the cylinder $E'$, to move the piston $E^3$ in the inverse direction of the arrow $x$, and with it the head block knees D, as before explained, and when the hand lever L is turned to the right the valve $E^7$ is shifted in the opposite direction, and the movement of the piston $E^3$ and the head block knees D takes place in an opposite direction, that is, in the direction of the arrow.

When the set shaft C rotates in either direction, as above described, the pinion $O'$ rotates the gear wheel O and hence the bevel gear wheel $H^2$, the index wheel P and the shaft H, in the opposite direction to the two-faced bevel gear $J^2$, so that the hanger $G^4$ stops swinging and only sufficient steam is admitted to the respective end of the cylinder $E'$, to move the piston $E^3$ at the same rate of speed that the hand lever L is turned by the operator.

In order to stop the head block knees D the operator stops the hand lever L, so that the pinion K and the double-faced gear wheel $J^2$ are held against rotation, and as the bevel gear wheel $H^2$ is driven from the rotating set shaft C by the pinion $O'$ and the gear wheel O, it is evident that the pinion J is caused to roll off on the face $J'$ of the now stationary double-face bevel gear wheel $J^2$ but in an opposite direction, to swing the hanger $G^4$ in an opposite direction and thus turn the rock shaft G in a reverse direction, until the valve $E^7$ has moved back to dead center position, thereby shutting off the steam from the corresponding end of the cylinder $E'$. Thus by the operator manipulating the hand lever L all the head block knees D connected with the main or set shaft C are bodily moved toward or from the same, and as fast or as slow as desired, and stopped correctly at the desired place.

The index wheel P rotating with the spur wheel O and the shaft H, is provided on its peripheral face with a linear graduation, on which indicates a pointer $P'$ held adjustably on the standard $I'$, the said graduation corresponding to the distance the faces of the head block knees D are from the saw. Thus the operator, by watching the graduation of the revolving index wheel relative to the pointer $P'$, can readily stop the hand lever L as soon as the graduation mark on the index wheel corresponding to the desired distance between the faces of the head block knees from the saw, reaches the pointer $P'$. Thus the operator can quickly and accurately set the head block knees independent of the main set works, and according to the thickness of the lumber to be cut.

When the head block knees are to be set by the main set mechanism, the hand lever L is locked against movement by engaging the free end $L'$ of the lever with the notch $N'$ in the hand wheel or disk N, and in doing so both shafts $K'$ and $N^2$ are locked together and rotate in the same direction, whereby the double-faced bevel gear wheel $J^2$ is caused to rotate in an opposite direction from the bevel gear wheel $H^2$ rotating with the gear wheel O, driven from the main or set shaft C by the pinion $O'$. Thus the hanger $G^4$ remains in a normal vertical position when the main or set shaft C is rotated by the main set mechanism, and hence the engine E remains dormant during the time the main set mechanism actuates the shaft C and the head block knees D.

The face $J^3$ of the double face bevel gear wheel $J^2$ and the pinion K have the same relative proportions as the gear wheels N³ and H′, that is, if the gear face J³ is twice the size of the pinion K, then the gear wheel H′ must be twice the size of the gear wheel N³, so that when the hand lever L is locked to the wheel N then the double-face bevel gear wheel J² turns with the same speed and in an opposite direction to the gear wheel H², thus holding the hanger G⁴ in its normal vertical position.

Having thus described my invention, I claim as new and desire to secure by Letters Patent:

1. In saw mill set works, a set mechanism for the head block knees, comprising an engine, a gearing actuated from the said engine and connected with said head block knees, for moving the same toward or from the saw, a manually-controlled shifting mechanism for the admission valve of the said engine, to move the valve from dead center position in either direction for running the engine piston forward or backward, the said shifting mechanism comprising a rock shaft connected with the engine admission valve, a stub shaft, a hanger mounted to swing thereon and connected with the said rock shaft, a pinion journaled on the said hanger, a loose two-face gear wheel on the stub shaft having one of its faces in mesh with the said pinion, a normally stationary gear wheel on the stub shaft in mesh with said pinion, a connection between the set shaft and the stub shaft and a manually-controlled shaft carrying a pinion in mesh with the other face of the said two-face gear wheel.

2. An auxiliary set mechanism for the head block knees of a saw mill, comprising an engine, a main shaft driven by the said engine and geared with the head block knees, and a shifting mechanism for the admission valve of the engine, having a rock shaft connected with the admission valve, a pivoted hanger connected at one end with the said rock shaft, a pinion mounted to rotate loosely on the other end of the said hanger, a train of gear wheels connected with the said pinion, a manually-controlled shaft for operating the said train of gear wheels, a normally stationary gear wheel in mesh with the said pinion, and a gearing connecting the said normally stationary gear wheel with the said main shaft.

3. A set mechanism for the head block knees of a saw mill, comprising an engine, a main shaft driven by the said engine and geared with the head block knees, and a shifting mechanism for the admission valve of the engine, having a rock shaft connected with the admission valve, a pivoted hanger connected at one end with the said rock shaft, a pinion mounted to rotate loosely on the other end of the said hanger, a train of gear wheels connected with the said pinion, a manually-controlled shaft for operating the said train of gear wheels, a normally stationary gear wheel in mesh with the said pinion, and a gearing connecting the said normally stationary gear wheel with the said main shaft.

4. The combination with the head block knees, of a set shaft provided with pinions, said knees having racks for engagement by the pinions, a countershaft, a pinion thereon, a rack meshing with the pinion, a piston connected to the rack, a cylinder in which the piston moves, a valve for controlling the admission of the motive fluid to the cylinder, a gear wheel on the counter-shaft, a pinion on the set shaft meshing therewith, a rock shaft provided with a plurality of arms, a link connecting one of the arms thereof with the valve, a stub shaft parallel with the set shaft, a driving connection between the set shaft and the stub shaft, a hanger journaled thereon, a bevel gear on the upper end of the hanger, a connection between the hanger and the other arm of the rock shaft, a double face bevel gear loose on the said shaft, one of whose faces meshes with the bevel gear of the hanger, a bevel gear secured to the stub shaft and meshing with the bevel gear of the hanger on the opposite side thereof and of equal diameter with the double face gear, a vertically arranged hollow shaft provided at its upper end with a notched disk, a bevel gear on its lower end, a bevel gear of greater diameter than the double face gear secured to the stub shaft and meshing with the bevel gear of the hollow shaft, a shaft in the hollow shaft, a lever for oscillating said shaft and provided with a tooth for engaging the notches of the disk, and a bevel gear wheel on the lower end of said shaft meshing with the other face of the double face gear.

5. The combination with the head block knees, of a set shaft for operating the knees, an engine, a rack operated by the engine, a pinion on the set shaft, a counter-shaft provided with a gear wheel meshing with the pinion, a pinion on the said counter-shaft with which the rack meshes, a valve for controlling the admission of the motive fluid to the cylinder, a rock shaft provided with a plurality of arms, one of which is connected with the valve, a stub shaft parallel with the set shaft, a driving connection between the set shaft and the stub shaft, a hanger journaled on the stub shaft, a bevel gear on the upper end of the hanger, a connection between the lower end of the hanger and the other arm of the rock shaft, a double face bevel gear loose on the stub shaft, one of whose faces meshes with the bevel gear of the hanger, a bevel gear secured to the stub shaft and meshing with the opposite side of the gear on the hanger, and of an equal diameter with the double face gear, a vertically arranged hollow shaft, a bevel gear thereon a bevel gear of greater diameter than the double face gear secured to the stub shaft and meshing with the bevel gear of the hollow shaft, a shaft in the hollow shaft, a lever for oscillating the same, and a bevel gear wheel on the lower end of said shaft meshing with the other face of the bevel gear.

6. The combination with the head block knees, of a set shaft for operating the knees, an engine operatively connected with the set shaft for rotating the same to move the knees, a valve for controlling the admission of the motive fluid to the engine, a swinging hanger having one end connected with the valve, a pinion journaled on the other end, a manually controlled shaft, a train of gears connecting said shaft with the pinion of the hanger, a shaft on which the hanger is journaled, a driving connection between said shaft and the set shaft, a gear wheel secured to said shaft and meshing with the pinion of the hanger, and means for rotating the manually controlled shaft whereby to operate the train of gears to swing the hanger.

7. A set mechanism for the head block knees of a saw mill, comprising an engine, a main shaft driven thereby and geared to the head block knees, and a shifting mechanism for the admission valve of the engine, said mechanism comprising a rock shaft connected with the admission valve, a swinging hanger connected at one end with the rock shaft, a pinion mounted to rotate on the other end of the hanger, a manually controlled shaft for operating said pinion, a shaft upon which the hanger is journaled, a driving connection between the shaft and the set shaft, and a gear wheel secured to the shaft, and meshing with the pinion on the hanger.

8. A set mechanism for the head block knees of a saw mill, comprising an engine, a main shaft driven thereby and geared to the head block knees, and a shifting mechanism for the admission valve of the engine, comprising a stub shaft having a driving connection with the set shaft, a hanger journaled on the stub shaft and connected at one end with the valve of the engine for operating the same, a pinion mounted to rotate on the other end of the hanger, a gear wheel secured to the stub shaft and meshing with one side of the pinion, a double face gear wheel loosely journaled on the stub shaft and meshing with the other side of the pinion, and manually operated means for turning the double faced gear wheel to swing the hanger.

In testimony whereof I have signed my name to this specification in the presence of two subscribing witnesses.

EMIL JOHNSON.

Witnesses:
E. M. BERGQUIST,
H. E. JORGES.